United States Patent [19]

Armbrust

[11] Patent Number: 5,279,194
[45] Date of Patent: Jan. 18, 1994

[54] BALL LOCK ASSEMBLY WITHOUT A CANISTER

[75] Inventor: William D. Armbrust, Cary, N.C.

[73] Assignee: Kennametal Inc., Latrobe, Pa.

[21] Appl. No.: 835,158

[22] Filed: Feb. 13, 1992

[51] Int. Cl.⁵ .............................................. B23B 29/04
[52] U.S. Cl. .................................... 82/160; 279/75; 409/233
[58] Field of Search ................ 82/160, 158; 409/232, 409/234, 233; 407/46, 101; 408/239; 279/75, 72, 81, 82, 904, 905

[56] References Cited

U.S. PATENT DOCUMENTS

| | | | |
|---|---|---|---|
| 3,254,567 | 6/1966 | Daugherty | 409/233 |
| 3,730,637 | 5/1973 | Cellini | 409/232 |
| 4,270,422 | 6/1981 | Andersson | 82/160 |
| 4,655,655 | 4/1987 | Schürfeld | 409/232 |
| 4,691,929 | 9/1987 | Neumaier et al. | 279/81 X |
| 4,708,040 | 11/1987 | Erickson | 82/160 |
| 4,747,735 | 5/1988 | Erickson et al. | 409/234 |
| 4,981,057 | 1/1991 | von Haas et al. | 82/160 |

FOREIGN PATENT DOCUMENTS

| | | | |
|---|---|---|---|
| 3130484 | 2/1983 | Fed. Rep. of Germany | 82/160 |
| 178105 | 8/1986 | Japan | 82/160 |
| 132079 | 6/1929 | Switzerland | 279/72 |
| 278625 | 10/1927 | United Kingdom | 279/72 |

*Primary Examiner*—Z. R. Bilinsky
*Attorney, Agent, or Firm*—James G. Porcelli

[57] ABSTRACT

A ball lock assembly having a cutting head and a locking component including a lock rod carrying at least one locking member. A positioning assembly operatively connects to the lock rod so that one can move the lock rod between a locked position and an unlocked position. In the locked position the locking member engages the cutting head to hold the cutting head to the locking component. In the unlocked position the locking member does not engage the cutting head so that the cutting head is not held to the locking component.

15 Claims, 5 Drawing Sheets

BALL LOCK ASSEMBLY WITHOUT A CANISTER

BACKGROUND OF THE INVENTION

The invention relates to a ball lock assembly that firmly secures a cutting head, which carries a cutting tool insert, to a locking component. More specifically, the invention relates to such a ball lock assembly that does not utilize a canister that retains the locking balls.

DESCRIPTION OF THE RELATED ART

U.S. Pat. No. 4,270,422 to Andersson shows a cutting tool with a clamping feature. In the structure shown by this patent, one rotates a bar to cause it to pull back and expand projections on the cutting head which facilitates the connection of the cutting head to the holder body.

U.S. Pat. No. 4,655,655 to Schürfeld shows a tool and workpiece holding arrangement where a tension rod of a replaceable secondary holder, which holds the cutting insert, is received within the bore of a clamping tube. By pulling the clamping tube, rollers engage the tension rod and slots in the clamping tube so as to retain the secondary holder to the primary holder. The device shown by this patent uses a canister to retain the clamping rollers.

U.S. Pat. No. 4,708,040 to Erickson, which is assigned to Kennametal Inc. as is the instant application, is hereby incorporated by reference and shows a structure for locking a toolholder to a support member. The support member carries a lock rod which when pulled, causes locking elements to roll out of depressions and onto a groove which causes the locking elements to move radially outwardly to thereby lock the toolholder to the support member. In the structure shown in this patent, the lock rod does not carry the locking elements.

U.S. Pat. No. 4,747,735 to Erickson et al which is assigned to Kennametal Inc., as is the instant application, is hereby incorporated by reference and shows a structure for locking a toolholder to a support member. In addition, Erickson et al teaches in FIGS. 1, 2, 3 and 5, two types of toolholder designs. As will be shown, these toolholders may be compatible with the ball lock assembly disclosed and claimed in the present application.

U.S. Pat. No. 4,981,057 to von Haas et al. shows a clamping device for connecting the tool head to a tool holder of a machine tool. The patent shows a structure with a shaft which upon rotation causes balls to move radially outwardly into engagement to lock the members together. Bores in the stem of the holder accommodate the balls.

SUMMARY OF THE INVENTION

It is a principal object of the invention to provide an improved ball lock apparatus for securing a cutting head to a locking component.

It is another object of the invention to provide an improved ball lock apparatus that uses a lock rod and locking balls without a canister.

It is still another object of the invention to provide an improved ball lock apparatus that provides for the positive locking of the cutting head to the locking component.

It is another object of the invention to provide an improved ball lock apparatus that provides for the detachment of the cutting head from the locking component only through a positive bumping of the cutting head to result in such detachment.

It is another object of the invention to provide an improved ball lock apparatus that provides a neutral position of the locking component relative to the cutting head in which the cutting head is frictionally held to the locking component even though the cutting head does not lock to the locking component.

In one form thereof, the invention is a ball lock assembly which comprises a cutting head and a locking component. The locking component includes a housing which contains a central longitudinal bore. A lock rod, which carries at least one locking member, is within the bore.

A moving means, which operatively connects to the lock rod, is capable of moving the lock rod between a locked position wherein the locking member engages the cutting head to hold the cutting head to the locking component and an unlocked position wherein the locking member does not engage the cutting head so that the cutting head is not held to the locking component.

In another form thereof, the invention is a ball lock assembly which comprises a cutting head and a locking component. The locking component has a housing with a central longitudinal bore. A lock rod is within the bore. The lock rod has opposite ends. The lock rod carries at one end thereof at least one locking member and contains a channel adjacent the other end thereof. The channel has a helical portion.

A positioning means, which operatively connects to the other end of the lock rod, positions the lock rod in either a locked position in which the locking member engages the cutting head to lock the cutting head to the locking component, a neutral position in which the locking member does not engage the cutting head which is frictionally held within the mouth of the bore, or an unlocked position in which the locking member does not engage the cutting head and the cutting head is not held to the locking component.

The positioning means includes a sleeve which surrounds the portion of the lock rod which contains the channel. A lock nut operatively connects to the sleeve so that upon the rotation of the nut the sleeve moves in the axial direction. The sleeve contains a radially inwardly projecting pin which engages the channel so that upon the axial movement of the sleeve the lock rod rotates.

In still another form thereof, the invention is a ball lock assembly which comprises a cutting head which has a shank that comprises a pair of oppositely disposed prongs containing oppositely disposed recesses. The prongs having a portion thereof being tapered. The ball lock assembly further comprises a locking component which includes a housing with a central longitudinal bore having a tapered mouth at one end thereof. The taper of the bore mouth corresponds to the tapered portion of the prongs of the cutting head.

The locking component further includes a lock rod with opposite ends. The lock rod has at least one locking member at one end of the lock rod and a helical channel at the other end thereof. A sleeve, which is movably positioned within the bore, surrounds the helical channel. A lock nut, which is rotationally retained to the housing, threadably connects to the sleeve so that the rotation of the lock nut imparts axial movement to the sleeve within the bore. A pin projects radially inwardly into the volume of the sleeve wherein the helical channel receives the pin so that the axial movement of the sleeve imparts a rotational movement to the lock rod.

The rotation of the lock nut positions the lock rod in either a locked position in which the locking member engages its corresponding recess in the prong to secure the cutting head to the locking component or an unlocked position in which the locking member does not engage its corresponding recess so that the cutting head is not secured to the locking member.

In still another form thereof, the invention is a ball lock assembly which comprises a cutting head and a locking component. The locking component includes a housing with a central longitudinal bore. The locking component further includes a lock rod with opposite ends wherein at least one locking member is near the one end of the lock rod and a helical channel is near the other end of the lock rod.

A sleeve is movably positioned within the bore and surrounds the helical channel. A lock nut, which is rotationally retained to the housing, threadably connects to the sleeve so that the rotation of the lock nut imparts axial movement to the sleeve within the bore. A pin projects radially inwardly into the volume of the sleeve so as to be received by the helical channel so that the axial movement of the sleeve imparts a rotational movement to the lock rod.

When in its axially rearwardmost position, the locking member engages the cutting head so as to secure the cutting head to the locking component. When in its axially neutral position, the locking rod has rotated the locking member out of engagement with the cutting head. When in its axially forwardmost position, the locking rod has impinged the cutting head so as to disengage the cutting head from the locking component.

BRIEF DESCRIPTION OF THE DRAWINGS

The foregoing and other aspects of the present invention will become more apparent upon review of the following detailed description of the invention in conjunction with the brief description of the drawings below.

DETAILED DESCRIPTION OF THE SPECIFIC EMBODIMENT

Figure 1:
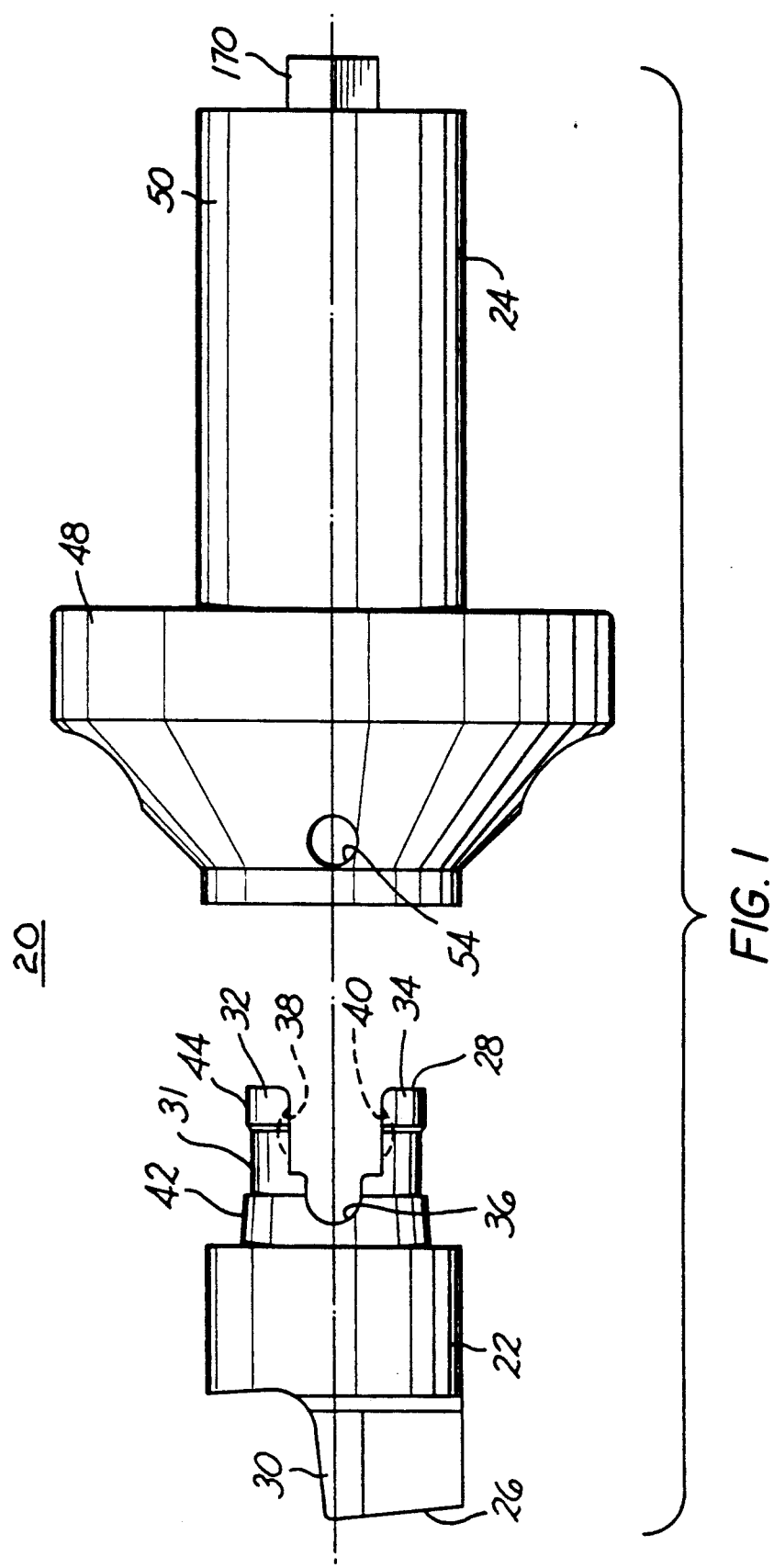
FIG. 1 is a side view of the specific embodiment of the invention with the cutting head removed from the locking component.

Referring to the drawings, and in particular to FIG. 1, a specific embodiment of the ball locking device is generally designated as 20. The ball locking device 20 includes two basic components; namely, the cutting head 22 and the locking component 24.

The cutting head 22 has opposite ends 26, 28, and carries a cutting tool insert 30 at one end 26. The other opposite end 28 presents a fork-shaped shank 31 defining an upper prong 32 and a lower prong 34 oppositely disposed from each other. A transverse locating channel 36 separates the upper prong 32 and the lower prong 34. The upper prong 32 and the lower prong 34 each contain a shallow recess 38, 40, respectively.

The structure of the upper and lower prongs is such that the external surface of portion 42 presents a taper. The taper is such that the dimension of portion 42 of the shank 31 decreases as it moves toward the terminal end 28 (to the right in FIG. 1) of the shank 31. The distal portion 44 of the prongs presents a cylindrical surface, although it is within the scope of the invention for distal portion 44 to present a tapered surface where the taper corresponds to the taper of portion 42.

The locking component 24 includes a head 48 and a locking mechanism 50. The head 48 has a general frusto-conical external shape.

Figure 2:
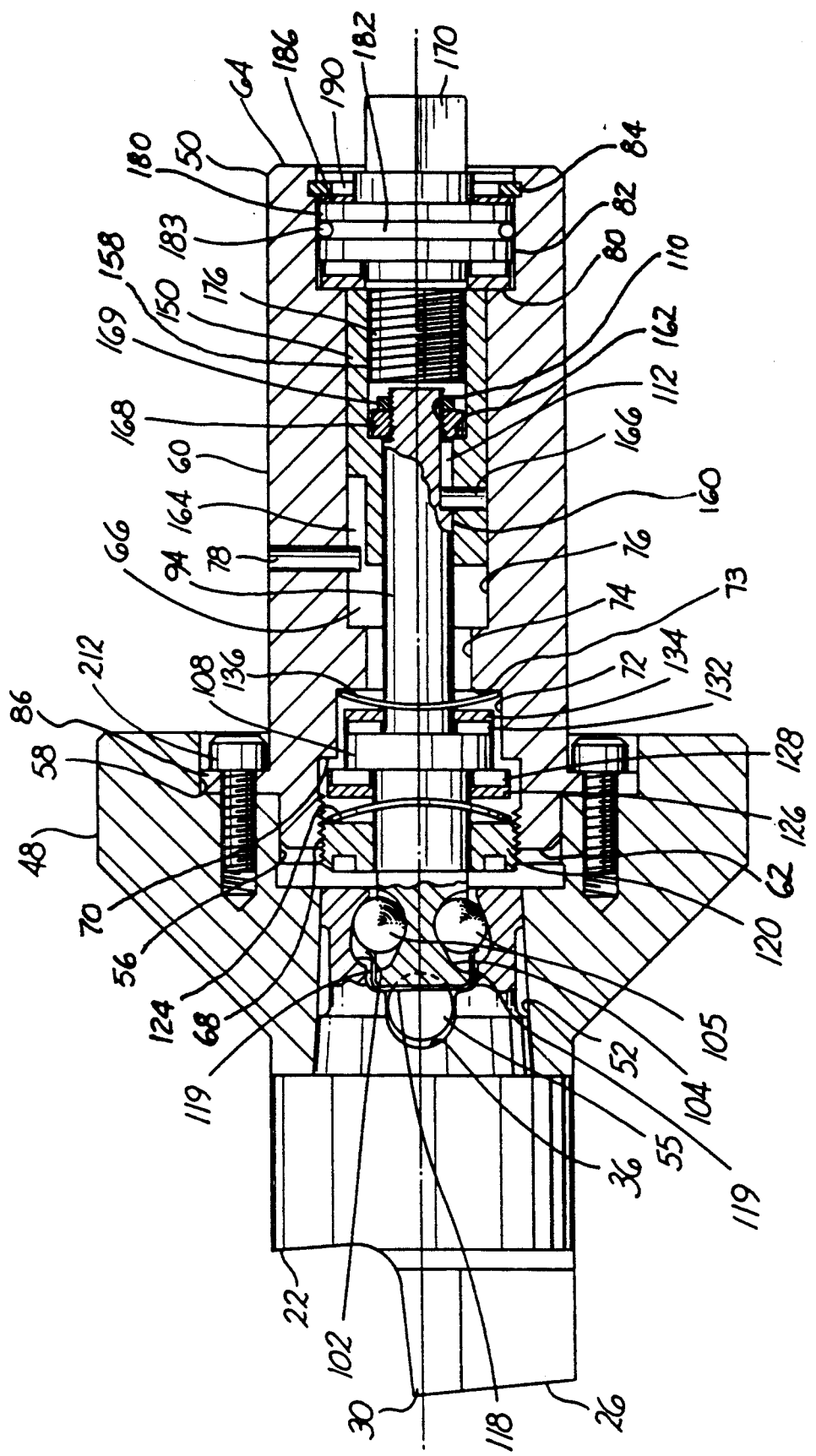
FIG. 2 is a side view of the specific embodiment of FIG. 1 where the cutting head is attached to the locking component, and with a section of the housing and cutting head removed so as to expose the internal elements of the locking component.

Referring now to FIG. 2, the head 48 contains an axially forward bore 52. The bore 52 tapers in such a fashion that the dimension of the bore 52 decreases as it moves axially rearwardly (to the right as shown in FIG. 2). The degree of taper of the bore 52 is such so as to receive the shank 31 of the cutting head 22. The bore 52 has a pair of oppositely disposed apertures 54 (see FIGS. 1 and 3) in the wall that defines the axially forward bore 52. A pin 55 passes through aperture 54. As shown in FIG. 2, when the cutting head 22 attaches to the locking component 24, the pins 55 facilitate the correct orientation and restricts rotation of the cutting head 22 on the locking component 24. When the shank 31 of the cutting head 22 is within the bore 52, each pin 55 is within the volume of the transverse channel 36.

The head 48 further contains a mediate bore 56 axially rearward (to the right as shown by FIG. 2) of the axially forward bore 52, and an axially rearward bore 58 axially rearward of the mediate bore 56.

While details of the cutting head 48 have been discussed and illustrated, it is possible to utilize cutting heads of a type different than cutting head 48. Specifically, the two types of toolholder 10 disclosed in FIGS. 1, 2, 3, and 5 and in the related discussion in U.S. Pat. No. 4,747,735 by Erickson et al may be substituted for the cutting head 48 shown.

Referring again to FIG. 2, the locking mechanism 50 includes an elongate cylindrical housing 60 that has opposite ends 62, 64. A central longitudinal bore 66 extends through the housing 60 along the central longitudinal axis thereof. The bore 66 includes an internally threaded portion 68 at one end 62 thereof. An annular shoulder 70 separates the threaded portion 68 from an axially rearward reduced diameter smooth bore portion 72. An annular shoulder 73 separates an annular projection 74 from the smooth bore 72. A reduced diameter bore portion 76 is axially rearward of the annular projection 74. A pin 78 passes through the housing 60 into the bore 76.

Another annular shoulder 80 separates the bore 76 from an enlarged diameter bore portion 82. The internal wall defining the enlarged diameter bore portion 82 contains an annular channel 84 therein.

Figure 3:
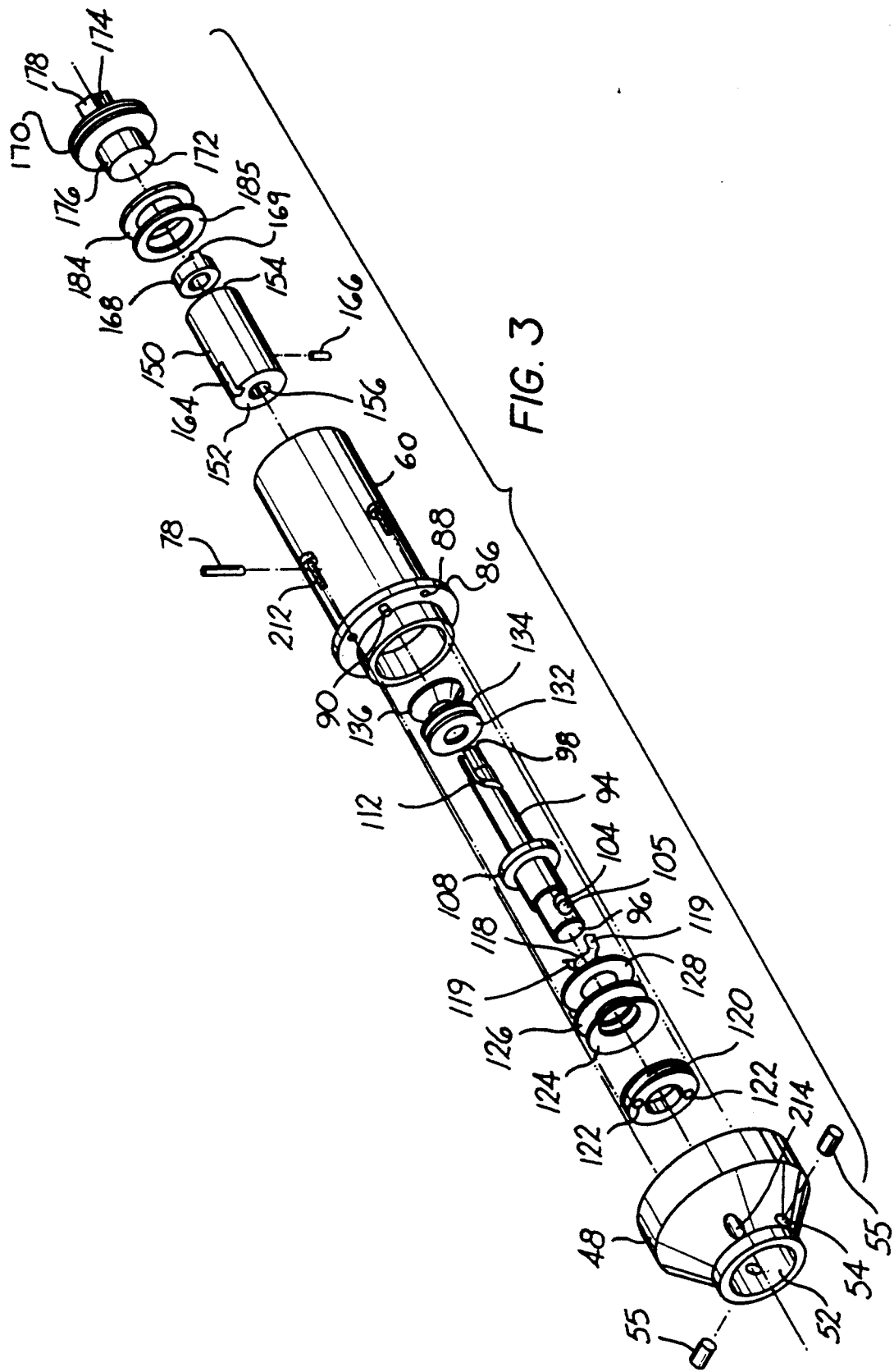
FIG. 3 is an perspective view of the locking component of the specific embodiment of FIG. 1 exploded along the central longitudinal axis thereof.

Referring to FIG. 3, an integral flange 86, which contains a plurality of apertures 88 and a centering pin 90, extends radially outwardly from housing 60.

Figure 4:
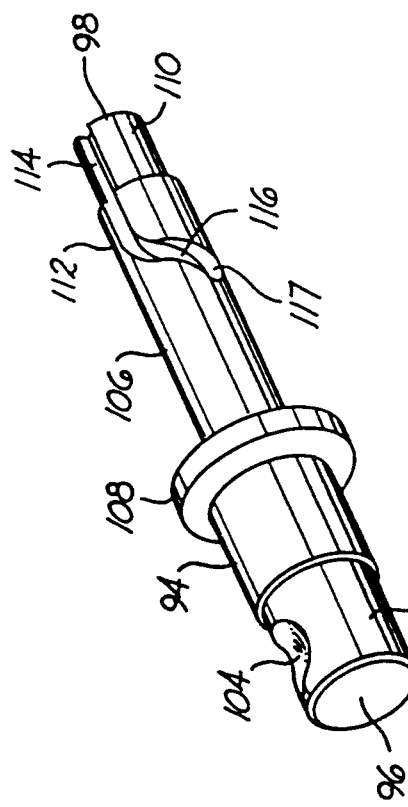
FIG. 4 is a perspective view of the lock rod of the specific embodiment of FIG. 1.

Referring to FIGS. 2, 3, and 4, the locking mechanism 50 further includes a lock rod 94 which has opposite ends 96, 98. The lock rod 94 has an axially forward larger diameter portion 100 which contains a pair of oppositely disposed pockets 102, 104 so that the pockets are proximate to one end 96. A locking ball 105 is within each pocket 102, 104. A spring clip 118 affixes to the forward end 96 of the lock rod 94. The spring clip 118 has a generally circular body with a pair of opposite integral arms 119. The distal end of each arm 119 biases against its respective ball 105 so as to retain the balls 105 within their respective pockets 102, 104. Yet, balls 105 may move against the bias of the spring clip 118 to some degree within pockets 102, 104.

The lock rod 94 further includes a reduced diameter portion 106. A mediate radial flange 108 separates the axially forward larger diameter portion 100 from the reduced diameter portion 106. The reduced diameter portion 106 presents a threaded section 110 at the other end 98 of the lock rod 94.

Referring especially to FIG. 4, the reduced diameter portion 106 contains a channel 112 therein. The channel 112 has a straight section 114 that passes through the threaded section 110 (threads illustrated in FIG. 2) and into the reduced diameter portion 106, and a helical section 116 which travels 90° about the circumference of the axially rearward portion 106 and then terminates in a small longitudinally oriented section 117 at the axially forward end. The helical section 116 has an inclination of about 45°.

Referring back to FIGS. 2 and 3, an annular retaining ring 120 with holes 122 in the forward surface thereof engages a Bellville spring 124, a washer 126 and a thrust bearing 128 so as to sandwich these three elements between itself and the axially outward surface of the mediate radial flange 108 of the lock rod 94.

A thrust bearing 132, a washer 134 and a Bellville spring 136 are sandwiched between the axially inward surface of the mediate radial flange 108 and the axially forwardly facing shoulder 73 that separates bore 72 from bore 74. The biasing forces generated by the Bellville springs 124, 136 keep the lock rod 94 in its neutral position as will be discussed hereinafter.

The locking mechanism 50 also includes a cylindrical sleeve 150 which has opposite ends 152 and 154. The sleeve 150 has a central bore 156 comprising a reduced diameter portion 160 at the one end 152 thereof, and an internally threaded portion 158 at the other end 154. An annular shoulder 162 separates the threaded portion 158 from the reduced diameter portion 160.

The sleeve 150 has an external longitudinal channel 164 adjacent the one end 152 thereof. A pin 166 passes through the wall of the sleeve 150 and into the volume of the reduced diameter portion 160 of the bore 156.

A nut 168, which has oppositely disposed notches 169, threadably connects to the threaded section 110 of the lock rod 94.

The locking mechanism 50 further includes a lock nut 170 which has opposite ends 172 and 174. The lock nut 170 has a threaded portion 176 at the one end 172 thereof and a hexagonal shape 178 at the other end 174 thereof. A mediate flange 180 separates the threaded portion 176 from the hexagonal portion 178. The mediate flange 180 contains an annular channel 182 in the circumferential surface thereof. The annular channel 182 receives a seal ring 183. A thrust bearing 184 is adjacent to the axially forward surface of the mediate flange 180, and a washer 185 is adjacent the thrust bearing 184.

A washer 186 is between the axially rearward surface of the mediate flange 180 and a snap retainer ring 190 which fits within the annular channel 84. The snap ring 190 retains the rear assembly within the housing.

Figure 7B:
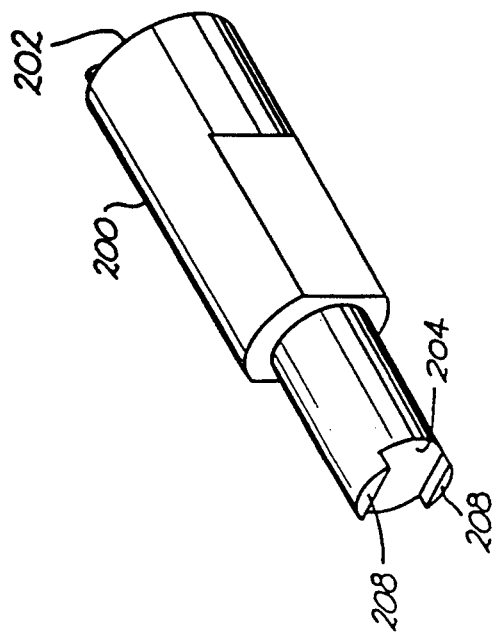
FIGS. 7A and 7B are perspective views of the special wrench used to disassemble and assembly certain parts of the specific embodiment of FIG. 1.
Figure 7A:
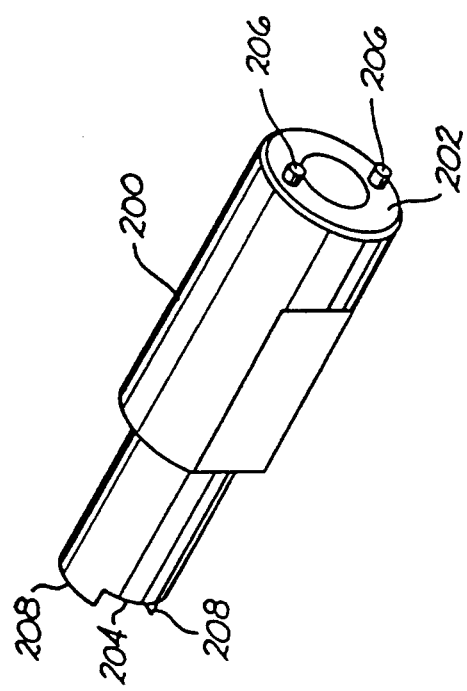

In the assembly of certain parts of the specific embodiment, one uses a special wrench 200 as shown in FIGS. 7A and 7B. The special wrench 200 has opposite ends 202 and 204. A pair of pins 206 project from the one end 202 of the wrench 200. A pair of fingers 208 project from the other end 204 of the wrench 200.

Referring to FIGS. 2 and 3, to assemble the specific embodiment, one positions the lock rod 94 within the bore 66 so that the one end 96 of the lock rod 94 protrudes out of the bore 66 at the threaded portion 68 thereof. The thrust bearing 132, washer 134 and Bellville spring 136 abut against the axially forward facing shoulder 73.

One then slides the sleeve 150 into the bore 66 through the other end 64 thereof. As shown in FIG. 2, one must align the sleeve 150 so that the external longitudinal channel 164 registers with pin 78 and the channel 112 registers with pin 166. One then threads the nut 168 to the threaded section 110 of the lock rod 94 using the special wrench 200. In this regard, the fingers 208 of the wrench 200 register with the notches 169 of the nut 168 so that one rotates the special wrench 200 to thread the nut 168 onto the lock rod 94.

One then slides the assembly comprising the retaining ring 120, the Bellville spring 124, washer 126 and the thrust washer bearing 128 over the one end 96 of the lock rod 94. The threads of the retaining ring 120 engage the threaded portion 68 of the bore 66. The pins 206 of the wrench 200 register with the holes 122 in the retaining ring 120 so that one then rotates the special wrench 200 so as to thread the retaining ring 120 into position. In this position, the Bellville spring 124, washer 126 and the thrust bearing 128 are sandwiched between the retaining ring 120 and the flange 108 of the lock rod 94.

While not illustrated, a flange may be provided at the forward end of the retaining ring 120 such that the flange acts as a positive stop when engaging the retaining ring 120 with the threaded portion 68 of the bore 66. This positive stop feature additionally provides a specific compression for the Bellville springs 124 and 136.

One then threads the threaded portion 176 of the lock nut 170 into the threaded section 158 of the sleeve 150. The washer 185 and thrust bearing 184 are sandwiched between the flange 180 of the lock nut 170 and the other end 154 of the sleeve 150. One then places the washer 186 over the hexagonal portion 178 of the lock nut 170 and snaps the snap ring 188 into engagement with the channel 84 in the bore 82.

The head 48 then attaches to the axially forward end 62 of the housing 60 so that the integral flange 86 is within the axially rearward bore 58 of the head 48. Bolts 212 pass through the apertures 88 and into threaded apertures in the axially rearwardly facing surface whereby the head 48 firmly secures to the housing 60. The positioning pin 90 also registers with its corresponding aperture in the axially rearwardly facing surface. The head 48 then attaches to a support via bolts or other fasteners passing through the apertures 214 in the head 48.

In the operation of the assembly, there are three basic conditions for the ball locking device 20. These are an unlocked condition, a locked condition and a neutral condition.

Figure 6:
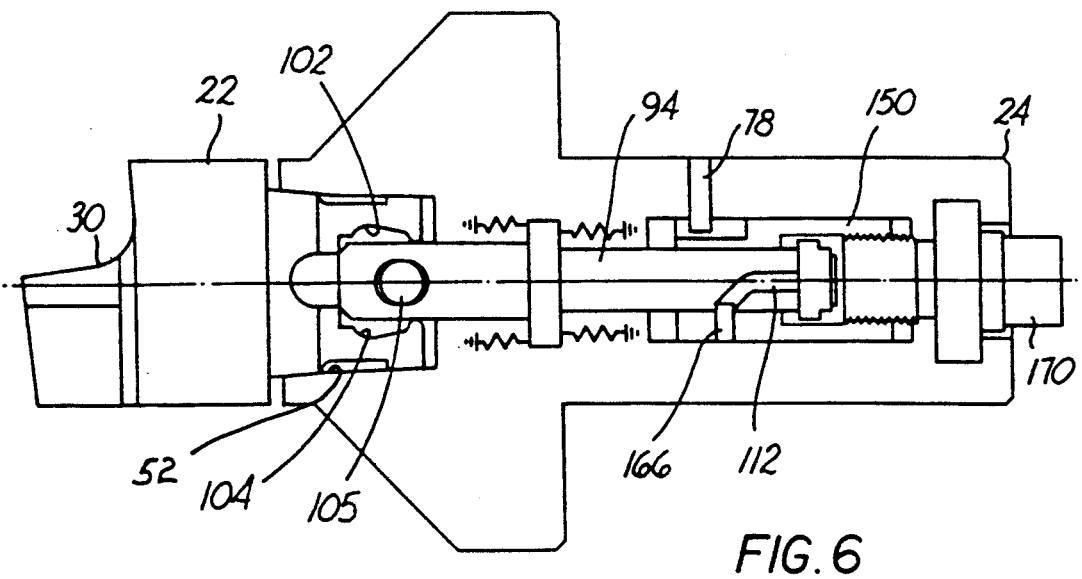
FIG. 6 is a mechanical schematic view of the specific embodiment of FIG. 1 in an unlocked position.

When in the unlocked condition, the lock rod 94 is in its axially forwardmost (the greatest left-hand position as shown by FIG. 6). At this point, the sleeve 150 is at its axially forwardmost position and the lock rod 94 has an orientation such that the pin 166 is in the longitudinally oriented portion 117 at the axially forwardmost end of the channel 112. Pin 78 registers with channel 164 in the sleeve 150. The locking balls 105, are out of registration with their corresponding recesses, 102, 104, and thus, have an orientation such that an axis through the centers thereof would be generally horizontal as viewed in FIG. 6. The forward end 96 of the lock rod 94 abuts against the cutting head.

To lock the cutting head 22 to the locking component 24, the shank 31 of the cutting head 22 must be within bore 52. Then one must rotate the lock nut 170 clockwise. Because of the threaded engagement between the lock nut 170 and the internally threaded portion 158 of the sleeve 150, the sleeve 150, which is also at its axially forwardmost position, moves axially rearward (to the right in FIG. 5 and 6).

As the sleeve 150 moves axially rearward, the pin 166, which engages channel 112 of the lock rod 94, remains within the channel. The pin 78 remains in the channel 164 of the sleeve 150 to prevent the sleeve 150 from any rotational motion.

Due to the helical configuration of the helical section 116 of the channel 112, the axially rearward movement causes the lock rod 94 to rotate. The total extent of rotation is 90° because of the fact that the helical section 116 extends over a 90° range on the surface of the lock rod 94. The rotation of the lock rod 94 causes the locking balls 105 to rotate 90° so to register with their corresponding shallow recesses 102, 104.

Once the pin 166 is at the axially rearward end of the helical channel 116, the further rotation of the lock nut 170 causes the sleeve 150 to contact the nut 168. Because of the contact between the sleeve 150 and nut 168, as one continues the axially rearward movement of the sleeve 150 there exists more resistance so that the rotation of the lock nut 170 becomes stiffer. Because of the engagement between the sleeve 150 and nut 168, the further rotation of the lock nut 170 causes the lock rod 94 to move axially rearwardly against the bias of the Bellville spring 136. Once the bias is overcome, there is a sudden slight axially rearward movement of the lock rod 94 thereby positively locking the locking balls 105 within the recesses 102, 104. At this point, as shown in FIG. 5, there is a positive two point contact between each locking ball 105 and its respective pocket and the recess.

Figure 5:
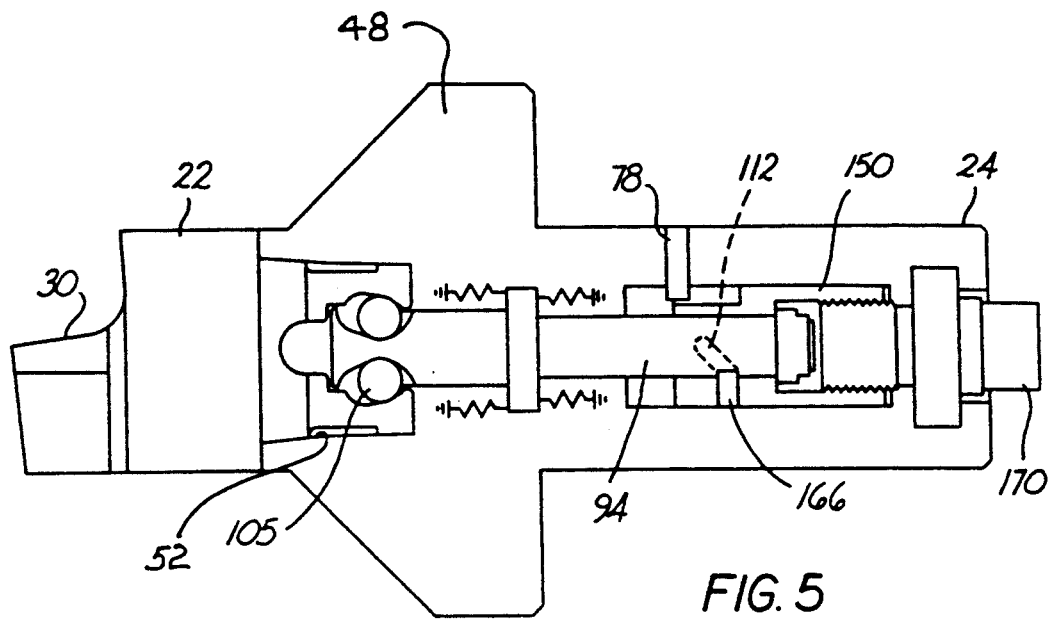
FIG. 5 is a mechanical schematic view of the specific embodiment of FIG. 1 in a locked position.

To unlock the ball locking device, the lock nut 170 is rotated in the counterclockwise direction so that the sleeve 150 moves axially forward (to the left from that position shown in FIG. 5). Again, the interaction between the pin 166 and the channel 112 causes the lock rod 94 to rotate back 90° to the position where the balls 105 do not register with recesses 102, 104. Once the pin 166 reaches the axially forward end of the helical section 116 of the channel 112, the rotation of the lock nut becomes stiffer. The continued rotation of the lock nut overcomes the bias of the Bellville spring 124 and causes the lock rod to suddenly move forward into the longitudinal portion 117, and positively bump the back surface of the cutting head 22 thereby bumping the cutting head 22 off of the tapered bore 52 in head 48.

Prior to the lock rod bumping off the cutting head, the locking mechanism is in a neutral condition with the locking balls rotated 90° so the balls do not register with their corresponding recesses. The biasing action of the Bellville springs 124 and 136 maintain the lock rod 94 in its neutral position. The taper lock between the cutting head and locking component keeps the cutting head on the locking component. This feature is of special advantage to reduce the unintentional detachment of the cutting head from the locking component when the cutting head is vertically disposed.

One can make changes and modifications in the above specific embodiment without departing from the scope of the invention, which applicants intend to limit only by the appended claims.

What is claimed is:

1. A ball lock assembly for releasably engaging a cutting head comprising:

a locking component including a housing containing a central longitudinal bore, a lock rod within said bore, said lock rod carrying at least one locking member;

moving means, operatively connected to the lock rod, for moving the lock rod between a locked position wherein the locking member engages the cutting head to hold the cutting head to the locking component and an unlocked position wherein the locking member does not engage the cutting head so that the cutting head is not held to the locking component;

wherein said lock rod having opposite ends, and said lock rod carrying at one end thereof said at least one locking member and containing a channel adjacent the other end thereof, said channel having a helical portion; and wherein said moving means including a sleeve surrounding the portion of the lock rod containing said channel, a lock nut being operative connected to said sleeve so that upon the rotation of said lock nut the sleeve moves in an axial fashion, said sleeve containing a radially inwardly projecting pin which engages the channel so that upon the axial movement of the sleeve the lock rod rotates.

2. The ball lock assembly of claim 1 further including a first biasing means for biasing the lock rod into the locked position.

3. The ball lock assembly of claim 2 further including a second biasing means for biasing the lock rod into the unlocked position.

4. A ball lock assembly for releasably engaging a cutting head comprising:

a locking component having a housing with a central longitudinal bore, and a lock rod within said bore;

said lock rod having opposite ends, said lock rod carrying at one end thereof at least one locking member and containing a channel adjacent the other end thereof, said channel having a helical portion;

a positioning means, operatively connected to the other end of the lock rod, for positioning the lock rod in either a locked position in which the locking member engage the cutting head to lock the cutting head to the locking component, a neutral position in which the locking member does not engage the cutting head and the cutting head is fictionally held within the mouth of the bore, or an unlocked position in which the locking member does not engage the cutting head and the cutting head is unlocked from the locking component; and said positioning means including a sleeve surrounding the portion of the lock rod containing said channel, a lock nut being operatively connected to said sleeve so that upon the rotation of said lock nut the sleeve moves in an axial fashion, said sleeve containing a radially inwardly projecting pin which engages the channel so that upon the axial movement of the sleeve the lock rod rotates.

5. A ball lock assembly for releasably engaging a cutting head having a shank comprising a pair of oppositely disposed tapered prongs containing oppositely disposed recesses with a portion thereof being tapered comprising:

a locking component including a housing with a central longitudinal bore having a tapered mouth at one end thereof, the taper of the bore mouth corresponding to the taper of the tapered portion of the prongs of the cutting head;

said locking component further including a lock rod having opposite ends with at least one locking member at one end of the lock rod and a helical channel near the other end of the lock rod;

a sleeve movably positioned within the bore and surrounding the helical channel, a lock nut rotationally retained to the housing and threadably connected to the sleeve so that the rotation of the lock nut imparts axial movement to the sleeve within the bore, a pin projecting radially inwardly into the volume of the sleeve so as to be received by the helical channel so that the axial movement of the sleeve imparts a rotational movement to the lock rod;

the rotation of the lock nut positioning the lock rod between a locked position in which the locking member engages one of the prong recesses in the prong to secure the cutting head to the locking component and an unlocked position in which the locking member does not engage its corresponding recess so that the cutting head is not secured to the locking member.

6. The ball lock assembly of claim 5 further including a first biasing means for biasing the lock rod into the locked position.

7. The ball lock assembly of claim 6 further including a second biasing means for biasing the lock rod into the unlocked position.

8. The ball lock assembly of claim 5 wherein the sleeve contains a channel therein, and the housing contains a pin projecting radially inwardly into the bore so as to register with the channel and thereby secure the sleeve against rotational motion.

9. The ball lock assembly of claim 5 wherein said lock rod contains a pair of opposite pockets at the one end thereof, and a pair of locking members with one locking member in each of the prong recesses.

10. The ball lock assembly of claim 9 wherein each of said locking members is a ball.

11. The ball lock assembly of claim 5 wherein a transverse channel separates the prongs, and a pair of oppositely disposed locator pins extending radially inwardly into the mouth of the bore so as to register with and position the cutting head within the mouth of the bore.

12. A ball lock assembly for releasably engaging a cutting head comprising:

a locking component including a housing with a central longitudinal bore;

said locking component further including a lock rod having opposite ends with at least one locking member near the one end of the lock rod and a helical channel near the other end of the lock rod;

a sleeve moveably positioned within the bore and surrounding the helical channel, a lock nut rotationally retained to the housing and threadably connected to the sleeve so that the rotation of the lock nut imparts axial movement to the sleeve within the bore, a pin projecting radially inwardly into the volume of the sleeve so as to be received by the helical channel so that the axial movement of the sleeve imparts a rotational movement to the lock rod;

when the lock rod is axially pulled from the lock rod end having the helical channel, the locking member engages the cutting head so as to secure the cutting head to the locking component;

when there is no axial force exerted on the lock rod end having the helical channel, the locking rod has rotated the locking member out of engagement with the cutting head; and when the lock rod is axially pushed from the lock rod end having the helical channel, the lock rod impinges the cutting head so as to disengage the cutting head from the locking component.

13. The ball lock assembly of claim 12 wherein the cutting head has a shank comprising a pair of oppositely disposed prongs presenting a tapered portion and containing oppositely disposed recesses.

14. The ball lock assembly of claim 13 wherein the bore has a tapered mouth at one end thereof, the taper of the bore mouth corresponding to the tapered portion of the prongs of the cutting head.

15. The ball lock assembly of claim 14 wherein when the locking rod is in the neutral position, the cutting head is fictionally held at its shank within the tapered mouth of the bore.

* * * * *